(12) United States Patent
Brown et al.

(10) Patent No.: US 6,378,337 B1
(45) Date of Patent: Apr. 30, 2002

(54) METHOD FOR PRODUCING BULK FUSED SILICA

(75) Inventors: John T. Brown, Corning; Michael S. Dobbins, Painted Post; Christine E. Heckle, Horseheads; Robert E. McLay, Syracuse; Mahendra K. Misra, Horseheads; Dale R. Powers, Painted Post; Michael H. Wasilewski, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 22 days.

(21) Appl. No.: 09/663,033

(22) Filed: Sep. 15, 2000

(51) Int. Cl.$^7$ .............................. C03B 20/00; C03B 8/04
(52) U.S. Cl. .............................. 65/17.4; 65/414; 65/421
(58) Field of Search ........................ 65/17.4, 414, 415, 65/416, 421, 422, 423, 413

(56) References Cited

U.S. PATENT DOCUMENTS

| | | | |
|---|---|---|---|
| 3,117,838 A | | 1/1964 | Sterling et al. ............... 23/182 |
| 4,038,370 A | | 7/1977 | Tokimoto et al. ............ 423/336 |
| 4,597,785 A | * | 7/1986 | Karbassiyoon et al. ........ 65/378 |
| 4,635,314 A | * | 1/1987 | Peckman et al. ............... 15/304 |
| 5,043,002 A | | 8/1991 | Dobbins et al. .............. 65/3.12 |
| 5,152,819 A | | 10/1992 | Blackwell et al. ............ 65/3.12 |
| 5,364,433 A | | 11/1994 | Nishimura et al. ........... 65/17.4 |
| 5,616,159 A | | 4/1997 | Araujo et al. ................. 65/17.4 |
| 5,896,222 A | | 4/1999 | Rosplock et al. ............. 65/17.4 |

FOREIGN PATENT DOCUMENTS

JP          1-138145          5/1989

* cited by examiner

Primary Examiner—Sean Vincent
(74) Attorney, Agent, or Firm—Timothy M. Schaeberle; Adenike Adewuya (57) ABSTRACT

A method for preparing high-purity, bulk fused silica includes supplying silane gas, a gaseous fuel, and oxygen gas to a combustion burner. Silica particles are formed by passing the silane gas into a flame formed by the combustion reaction of the gaseous fuel with the oxygen gas while maintaining the ratio of the flow rate of the gaseous fuel to the flow rate of the silane gas no less than twelve and the ratio of the flow rate of the gaseous fuel to the flow rate of the oxygen gas no less than three. The silica particles formed are immediately deposited onto a hot bait to form a boule.

17 Claims, 5 Drawing Sheets

METHOD FOR PRODUCING BULK FUSED SILICA

BACKGROUND OF THE INVENTION

1. Technical Field

The invention relates generally to production of optical lenses for use in microlithography systems and other applications requiring transmission of ultraviolet radiation. More particularly, the invention relates to production of bulk fused silica for use in fabricating the optical lenses.

2. Background Art

Fused silica is well known for its use in the production of large telescope mirrors and optical fibers. Fused silica is also used for producing other optical elements such as lenses. Recently, fused silica has found a variety of uses in applications requiring transmission of ultraviolet radiation. One such application is in microlithography systems, which are employed in the production of integrated circuits in the semiconductor industry. These systems use multiple fused silica lenses, called stepper and scanner lenses, to transmit radiation from excimer lasers to photosensitized silicon wafers. It is important that the lenses are made from high-purity fused silica because impurities in the lenses can distort the images projected onto the wafers, as well as change the optical characteristics of the lenses.

Several patents have issued that describe methods for producing fused silica lenses for use with excimer lasers. U.S. Pat. No. 5,616,159 issued to Araujo et al. describes a method of forming an optical member or blank for use with light having a wavelength range shorter than about 300 nm. The method consists essentially of forming a blank from high-purity synthetic silica glass containing hydroxyl (OH) groups in an amount no greater than 10 ppm by weight and doping the formed blank with molecular hydrogen to increase the resistance of the optical member to laser damage. U.S. Pat. No. 5,896,222 issued to Rosplock et al. discloses a method of producing a fused silica glass lens that transmits ultraviolet radiation having a wavelength below 300 nm with controlled optical damage and inhibited red fluorescence during such transmission. The fused silica glass lens has hydrogen content below $10^{18}$ molecules/cm$^3$ and is made by thermal conversion of a polymethylsiloxane precursor.

U.S. Pat. No. 5,364,433 issued to Nishimura et al. discloses a method for producing a synthetic quartz glass optical member for an ultraviolet laser. The method consists of forming a quartz glass with OH group content ranging from 10 to 100 ppm, a chlorine content of not more than 200 ppm, a hydrogen molecule content of not more than $10^{16}$ molecules/cm$^3$, a uniformity refractive index distribution of not more than $5 \times 10^{-6}$ as expressed in terms of $\Delta n$, and a birefringence of not more than 5 nm/cm. The quartz glass is made by thermal conversion of volatile silicon compounds to fine particles of silica glass, followed by deposition of the silica particles on a heat-resistant substrate to form a rod-like porous ingot of synthetic silica glass. Examples of the volatile compounds include alkoxysilanes or alkylpolyalkoxysilanes, tetramethoxysilane, silane compounds, and volatile inorganic silicon compounds, e.g., silicon tetrachloride.

Generally, processes for producing fused silica comprise providing a feedstock solution, generating vaporous reactants from the feedstock, transporting the vaporous reactants to a reaction site, and converting the vaporous reactants to fine silica particles by thermal decomposition with oxidation and/or flame hydrolysis. Thermal decomposition with oxidation involves passing the vaporous reactants and an oxidant through a zone that is heated to at least the pyrolytic temperature of the vaporous reactants. The heat decomposes the vaporous reactants to silicon and other elements, and the oxidant combines with silicon to produce the silica particles. In flame hydrolysis, the vaporous reactants are introduced into a flame formed by combustion reaction of a hydrogen-containing fuel with oxygen. The combustion reaction results in production of sufficient water to hydrolyze the vaporous reactants or oxygen to oxidize the vaporous reactants. The combustion reaction also results in production of sufficient auxiliary heat to promote the thermal environment necessary to produce the silica particles.

The silica particles can be immediately deposited on a hot bait or crucible to give a non-porous, transparent, bulk glass, commonly called a boule. The boule can be used individually to fabricate optical elements such as lenses or finished and integrated into large optical bodies such as telescope mirrors. Alternatively, the silica particles can be deposited on a heat-resistant substrate to give a porous silica ingot, commonly called silica soot. A porous silica ingot can also be produced using vapor-phase axial deposition technique, outside vapor deposition technique, plasma-activated chemical vapor deposition technique, and a host of other chemical vapor deposition techniques. The porous silica ingot can be subsequently thermally consolidated, molded, and heat-treated to give a non-porous, transparent, glass article.

It has been found that the selection of the feedstock used in the production of fused silica is as important as the design of the equipment used to produce the fused silica. For a long time, the standard feedstock used in the production of fused silica was silicon tetrachloride ($SiCl_4$). $SiCl_4$ was selected because it yielded large amounts of vapors at low temperatures—$SiCl_4$ has vapor pressures of 200 to 300 mm Hg in a temperature range of 21° C. to 31°C. Using $SiCl_4$ as a precursor in flame hydrolysis, however, has a drawback in that the by-product of the process is hydrochloric acid (HCl), an environmentally unfriendly material that requires considerable care for its disposal. In recent years, several processes for producing fused silica using halide-free feedstock have been proposed. These halide-free production processes were developed in response to increased sensitivity to the environment and stricter government regulations.

Figure 1:
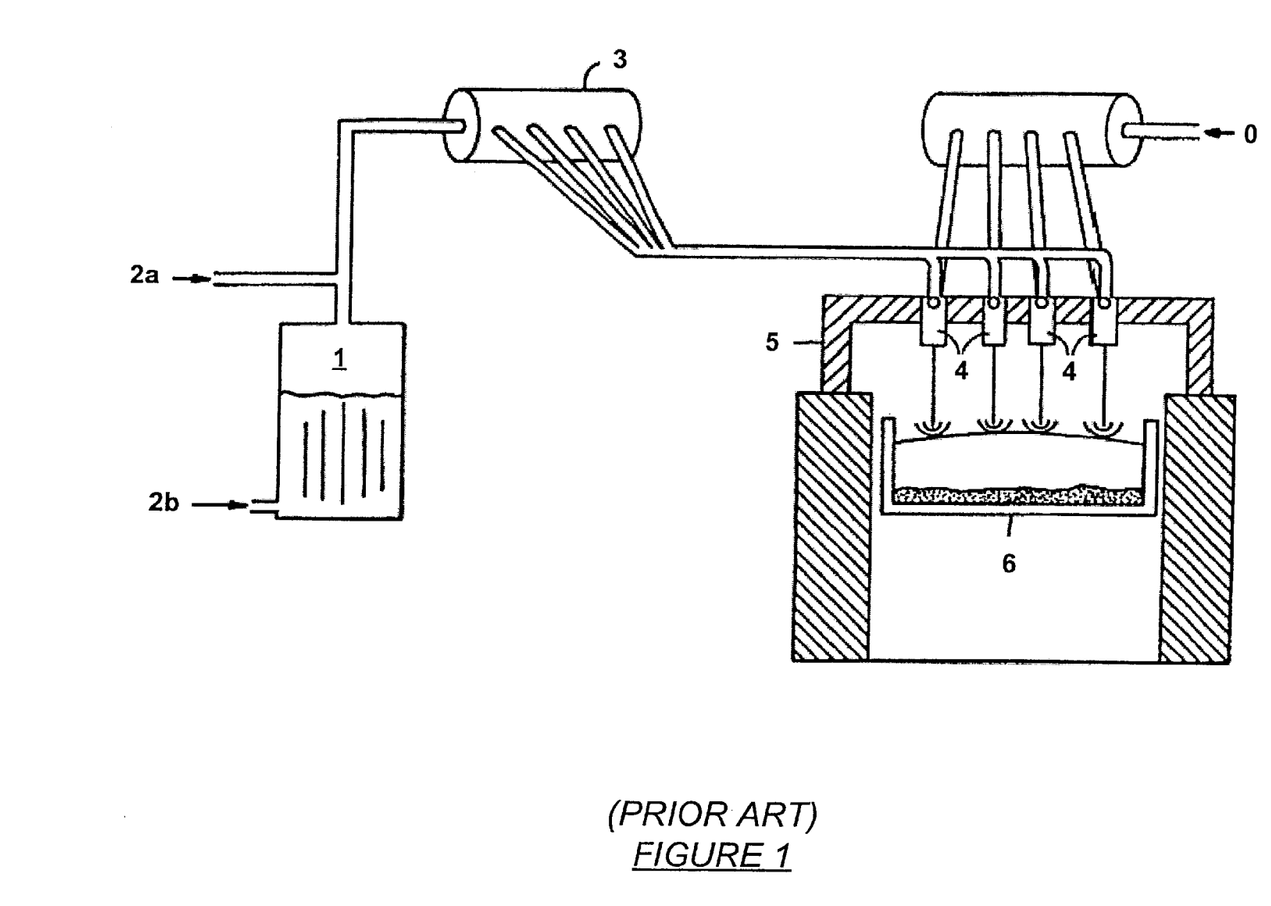
FIG. 1 illustrates a prior art process for making bulk fused silica using OMCTS.

U.S. Pat. No. 5,043,002 issued to Dobbins et al. discloses a process for making fused silica using polymethysiloxane, in particular, octamethylcyclotetrasiloxane (OMCTS), which is represented by $Si_4O_4(CH_3)_8$. The process is illustrated in FIG. 1. First, OMCTS 1 is vaporized by heating at 100–150° C. and bubbling with an inert carrier gas 2b, e.g., nitrogen. A stream of inert gas 2a, e.g., nitrogen, is brought into contact with the OMCTS 1 vapors to prevent saturation of the vapors. The streams of gases 2a, 2balong with the OMCTS 1 vapors are carried to a distribution mechanism 3, which in turn transports the OMCTS 1 vapors to a reaction site. The reaction site includes a number of burners 4 which fire into a furnace crown 5. A fuel/oxygen mixture 0 is conducted to the burners 4 and exit burner orifices which are separate from those used in the burning of OMCTS. The burning of the fuel and OMCTS results in silica particles. The silica particles are directed downwardly and immediately deposited and consolidated into a non-porous mass on a hot bait 6. The by-products of the process are carbon dioxide and water.

U.S. Pat. No. 5,152,819 issued to Blackwell et al. discloses a process for making fused silica using an organosilicon-R compound as feedstock, where R is an element of the periodic table. The preferred organosilicon-R compound has the following properties: (1) a Si—R bond dissociation energy that is no higher than the dissociation energy of the Si—O bond, (2) a boiling point that is no higher than 350° C., and (3) produces, upon pyrolysis and/or hydrolysis, decomposition products besides $SiO_2$ which are considered to be environmentally safe. Three classes of organosilicon-R compounds were proposed, including organosilicon-oxygen compounds having a basic Si—O—Si structure, organosilicon-nitrogen compounds having a basic Si—N—Si structure, and siloxasilazanes having a basic Si—N—Si—O—Si structure. These compounds have a significant vapor pressure when heated above 150° C. A number of organosilicon-R compounds were disclosed, including tris ketenimine, nonamethyltrisilazane, octamethylcycotetrasilazane, and hexamethylcyclotrisiloxazane, a siloxasilazane. Non-porous mass of fused silica is produced using a process similar to the one disclosed by Dobbins et al., except that OMCTS is replaced by an organosilicon-R compound that satisfies the criteria above.

U.S. Pat. No. 4,038,370 issued to Tokimoto et al. discloses a process for making high-purity transparent vitreous silica using a high-purity, silane-type gas. Examples of high-purity, silane-type gases used in the process include silane ($SiH_4$), dichlorosilane ($SiH_2Cl_2$), trichlorosilane ($SiHCl_3$), and silicon tetrachloride ($SiCl_4$). The vitreous silica is produced by supplying the silane-type gas, an inert gas, hydrogen gas, and oxygen gas to a burner to carry out flame hydrolysis. The flow rate of the hydrogen gas was maintained at least six times the flow rate of the silane gas, while the flow rate of the oxygen gas was maintained less than 1.5 times a theoretical supply flow rate required for completely oxidizing the silicon in the silane and the hydrogen existing during the flame hydrolysis process. The vitreous silica obtained from the flame hydrolysis process included metastable OH. The vitreous silica was heat treated at a temperature higher than 800° C. in an inert atmosphere to reduce the hydroxyl (OH) content of the vitreous silica to discharge the metastable OH and reduce the OH content to a range from 40 to 60 ppm.

U.S. Pat. No. 3,117,838 issued to Sterling et al. discloses a process for making fused silica or quartz by thermal decomposition with oxidation of silane ($SiH_4$). In one of the disclosed embodiments, silane and oxygen are fed into a burner or torch jet and the flame is allowed to impinge on a carbon substrate upon which silica is to be deposited. The flame is formed by spontaneous ignition of silane with oxygen. Silane is combusted to form silica particles, which accumulate on the carbon substrate to form a solid body of transparent silica. It is not necessary to vaporize silane because silane exists as vapor at room and elevated temperatures. Oxygen is supplied to the interior and exterior of the jet of silane to ensure complete combustion of silane. The flow of oxygen and the flow of silane are regulated to ensure an excess of about 25% by volume of oxygen. In other embodiments, silane is reacted with carbon dioxide, nitrous oxide, or water to produce high purity material.

SUMMARY OF THE INVENTION

A method for preparing high-purity, bulk fused silica includes supplying silane gas, a gaseous fuel, and oxygen gas to a combustion burner and forming silica particles by passing the silane gas into a flame formed by the combustion reaction of the gaseous fuel with the oxygen gas while maintaining the ratio of the flow rate of the gaseous fuel to the flow rate of the silane gas no less than twelve and the ratio of the flow rate of the gaseous fuel to the flow rate of the oxygen gas no less than two. The method further includes immediately depositing the silica particles onto a hot bait to form a boule.

DETAILED DESCRIPTION OF THE INVENTION

Figure 2:
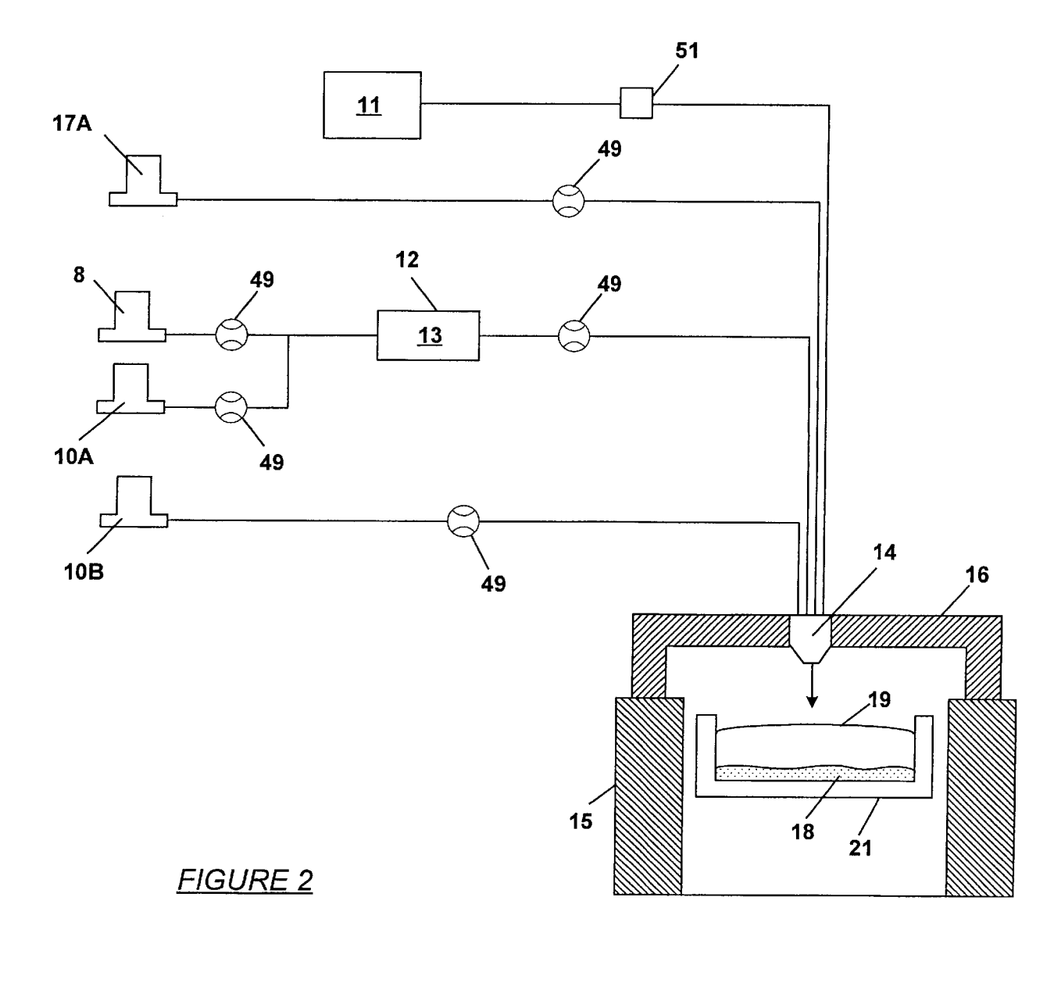
FIG. 2 illustrates a process for making bulk fused silica using silane.

High-purity bulk fused silica is produced by flame hydrolysis of silane, a chemical compound represented by the chemical formula $SiH_4$. FIG. 2 illustrates the process. Fuel 8 and oxygen 10A are mixed in a premixing chamber 12, and fuel/oxygen mixture 13 is transferred from the premixing chamber 12 to a burner 14. The burner 14 is mounted on the crown 16 of a refractory furnace 15. The burner 14 burns the fuel/oxygen mixture 13 to produce a flame. The fuel 8 may be hydrogen, methane, or other hydrogen-containing fuel, and the oxygen 10A may be in its pure state or may be admixed with inert gases such as nitrogen, argon, helium, or carbon dioxide. After the furnace crown 16 is sufficiently heated, silane 11 is injected into the furnace crown 16 through the center of the burner 14. It should be noted that silane 11 exists as a vapor at room temperature and does not need to be vaporized prior to being injected into the furnace crown 16. However, silane 11 will spontaneously burn in the presence of oxygen. Therefore, silane should be stored in an inert atmosphere to prevent burning prior to being injected into the furnace crown 16.

Nitrogen 17A and Oxygen 10B are also injected into the furnace crown 16 through the burner 14. Silane 11 reacts with the flame produced by combustion reaction of the fuel/oxygen mixture 13 and the oxygen 10B to produce fine amorphous silica particles, along with a stream of volatile gases that can be separated from the silica particles. The silica particles are directed downwardly to a target or bait 18 where they immediately consolidate into a very viscous fluid which is later cooled to the solid state. The non-porous mass 19 formed by the deposited silica particles is referred to as a boule. The bait 18 covers the bottom of a containment vessel 21. U.S. Pat. No. 5,698,434 issued to John E. Maxon discloses the construction of a containment vessel that is suitable for use with the invention. The combustion reaction of silane 11 and fuel/oxygen mixture 13 heats the bait 18 to a sufficiently high temperature so that the glass is directly formed. In other words, a porous silica ingot is not formed that is consolidated in a separate step. Consolidation typically occurs at roughly 1550° C. or greater. To ensure homogeneity of the fused silica, the containment vessel 21 is rotated and oscillated as the silica particles are deposited. U.S. Pat. No. 5,696,038 issued to John E. Maxon discloses oscillation patterns that are suitable for use in the invention.

Silane 11 is oxidized to water and silica at the burner 4. The following chemical reactions (1) and (2) or (3) happen simultaneously in the flame hydrolysis process:

$$SiH_4 + 2O_2 \rightarrow SiO_2 + 2H_2O \qquad (1)$$

$$CH_4 + 2O_2 \rightarrow CO_2 + 2H_2O \qquad (2)$$

$$2H_2 + O_2 \rightarrow 2H_2O \qquad (3)$$

Ordinarily, silane could be burned in air to make silica particles. However, when silane is used to make a glass boule, an additional heat source such as fuel or plasma is required to heat the bait 18 so that the silica particles consolidate as they are deposited. If the bait 18 is insufficiently heated, a porous silica ingot or "elks" teeth, i.e., little lumps of glass, is produced. Reaction (1) above is used to generate the silica particles and some heat. The fuel 8 in the fuel/oxygen mixture 13, which is shown as $CH_4$ (methane) in reaction (2) and $H_2$ (hydrogen gas) in reaction (3), and an oxidant, e.g., oxygen gas ($O_2$), react to produce the majority of the heat that heats the bait 18 above 1500° C. to produce the boule 19.

To avoid the formation of porous glass and/or "elks teeth", the ratio of the flow rate of the fuel 8 in the fuel/oxygen mixture 13 to the flow rate of the silane 11 should be at least twelve, and the ratio of the flow rate of the fuel 8 in fuel/oxygen mixture 13 to the flow rate of the total oxygen injected into the furnace crown 16 should be at least two. It should be noted that the total oxygen injected into the furnace crown 16 includes the oxygen 10A in the fuel/oxygen mixture 13 and the oxygen 10B. Too much heat can also degrade the quality of the glass produced. Preferably, the ratio of the flow rate of the fuel 8 in the fuel/oxygen mixture 13 to silane 11 is in a range from 12.5 to 30, and the ratio of the flow rate of the fuel 8 in the fuel/oxygen mixture 13 to the total oxygen injected into the furnace crown 16 is in a range from 2.0 to 3.0.

The by-products of the process depicted by chemical reactions (1) and (2) are water ($H_2O$) and carbon dioxide ($CO_2$). The chemical reactions (1) and (2) assume complete combustion of methane (fuel) and silane. In a reducing atmosphere, the by-products of the process would also include carbon monoxide (CO) and hydrogen gas ($H_2$). The by-product of the process depicted by chemical reactions (1) and (3) is water ($H_2O$). The chemical reactions (1) and (3) assume complete combustion of hydrogen gas (fuel) and silane. In a reducing atmosphere, the byproduct of the process would also include hydrogen gas ($H_2$). A reducing atmosphere is a condition in which the total oxygen passed to the burner 4 is less than is theoretically required to completely oxidize the silane and fuel. A reducing atmosphere yields a silica glass with high levels of molecular hydrogen. Preferably, the concentration of hydrogen in the fused silica is about $10^{18}$ molecules/cm$^3$ or greater. The amount of fuel used is typically much greater than the amount of silane.

Figure 3:
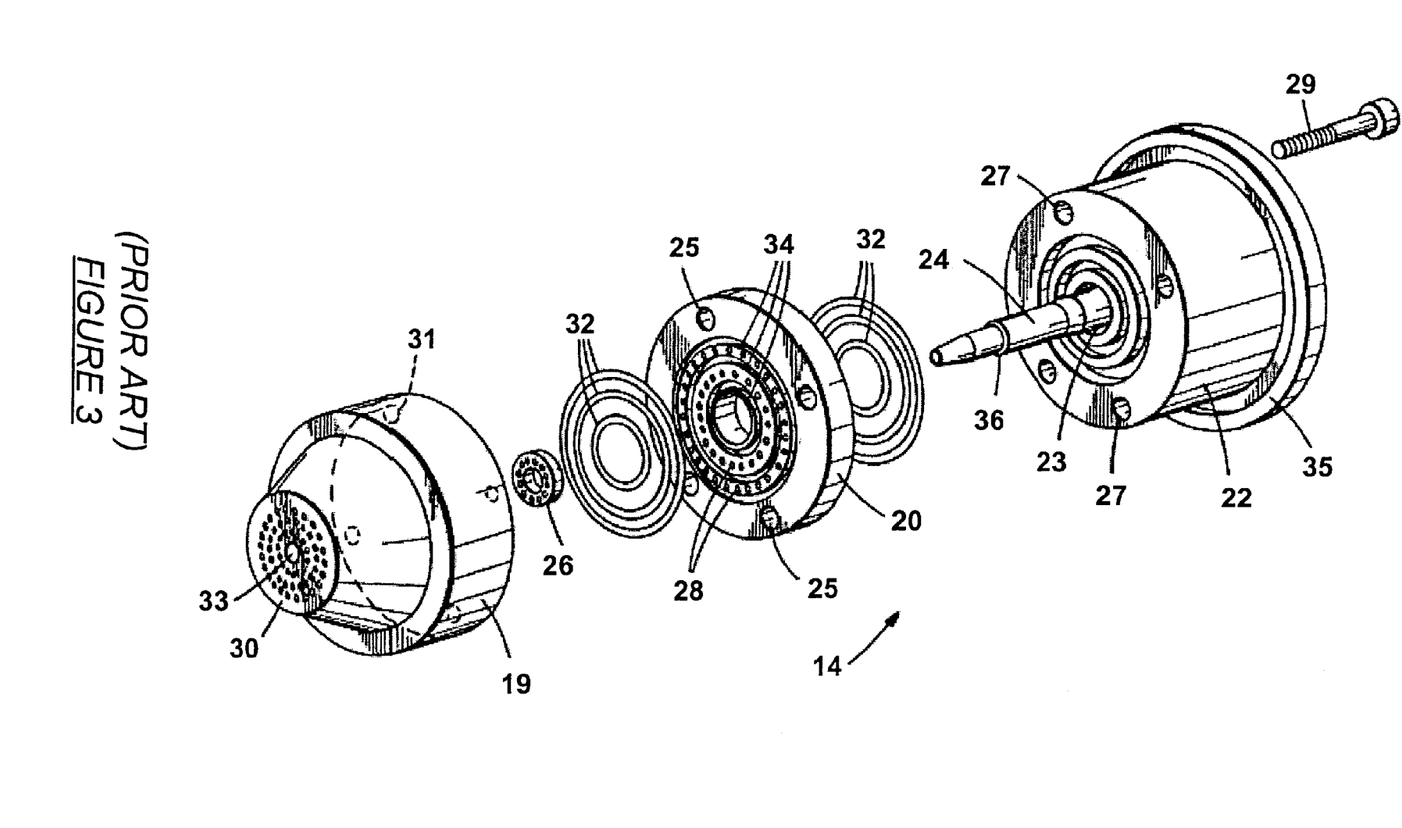
FIG. 3 is an exploded view of a prior art burner.

The burner 14 may be any of the standard or precision burners used in conventional flame hydrolysis processes. U.S. Pat. No. 5,922,100 issued to Cain et al., assigned to Corning, Incorporated, discloses examples of burners that may be used in the process. One of the burners disclosed, as shown in FIG. 3, includes a face block 19, a manifold plate 20, a back block 22, a fume tube 24, and an inner shield manifold 26. The manifold plate 20 includes orifices 28 for providing uniform gas flows at burner face 30. O-rings 32 are received in grooves 34 of the manifold plate 20 and serve to prevent gas leakage between various passages of the burner. The fume tube 24, which is threaded at its rear end, extends through the back block 22 and carries the inner shield manifold 26 at its leading end. When the burner is assembled, the inner shield manifold 26 abuts a shoulder 36 of the fume tube 24.

The burner is assembled by inserting the fume tube 24 into a central aperture in the back block 22 and rotating the fume tube 24 so that the threaded end of the fume tube 24 engages a similarly threaded portion in the back block 22. Then o-rings 32 are inserted in the grooves 34 of the manifold plate 20, and the manifold plate 20 is slid over the leading end of the fume tube so as to be positioned adjacent the back block 22. The bolt holes 25 and 27 in the manifold plate 20 and the back block 22, respectively, are aligned. Next, the inner shield manifold 26 and the face block 19 are slid over the fume tube 24, and the face block 19 is rotated to align the bolts 31 with the bolts 25 in the manifold plate 20. Bolts 29 are inserted into the aligned bolt holes 25, 27, and 31, to hold the burner together. The assembled burner is then mounted on a gas-supplying manifold (not shown) by means of a mounting flange 35.

Figure 4:
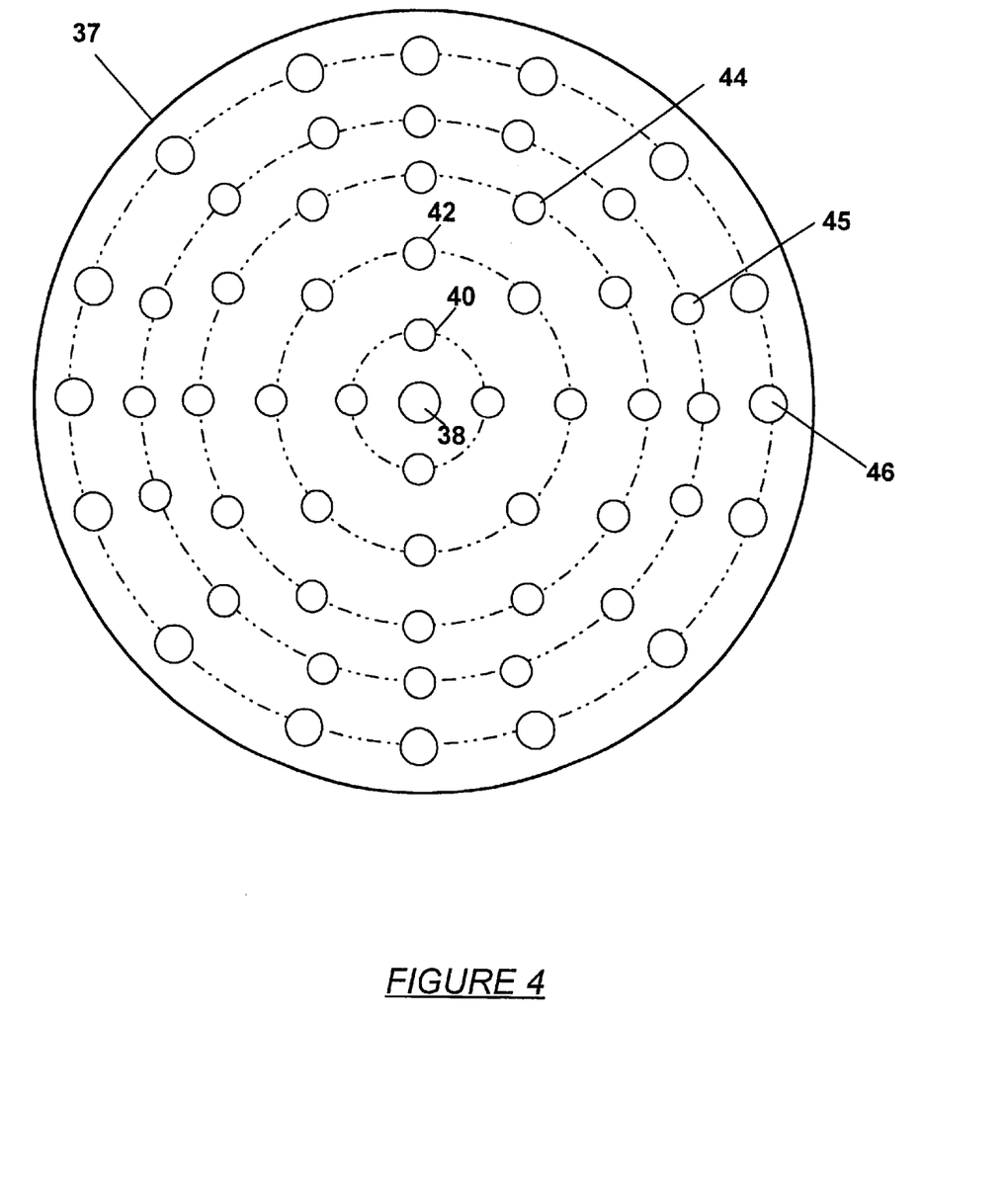
FIGS. 4 and 5 are plan views of burner faces.
Figure 5:
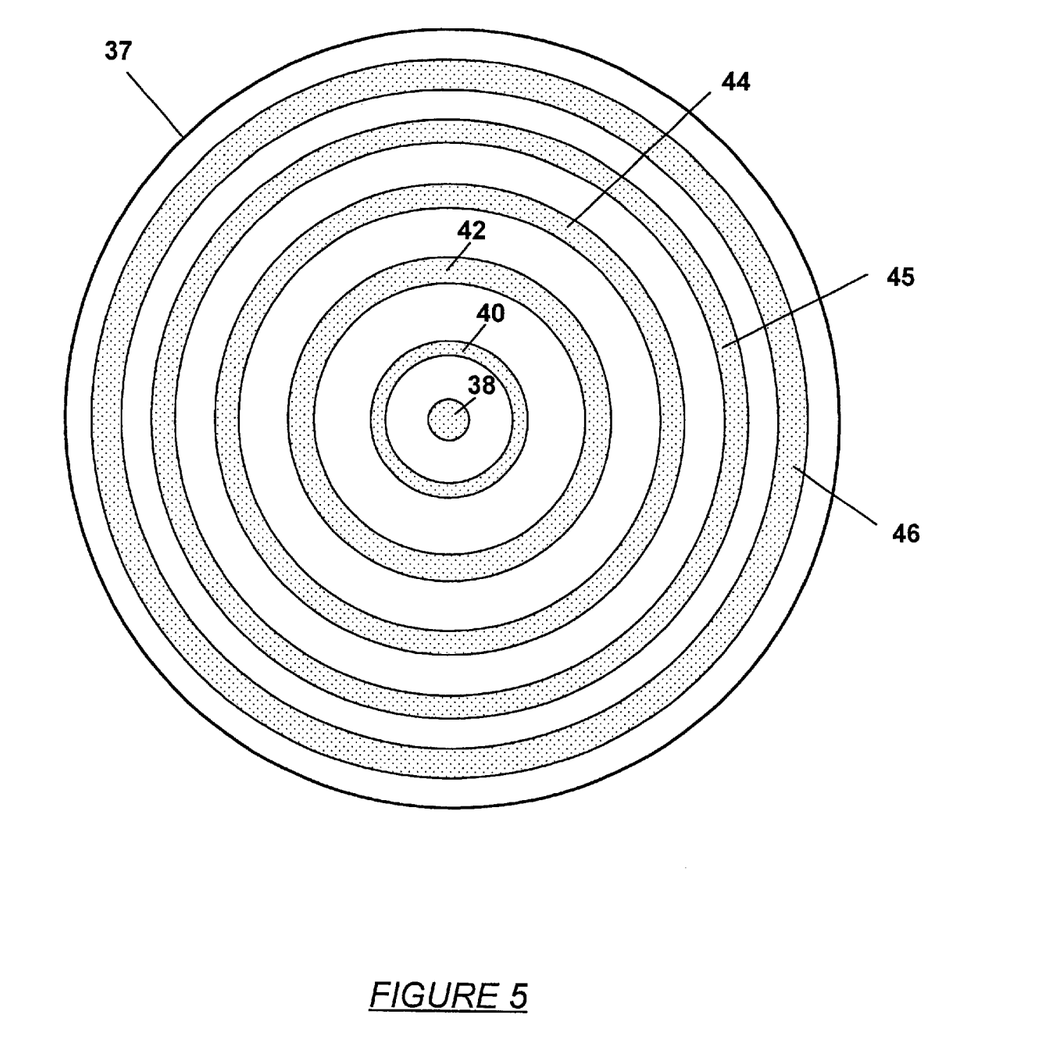

The burner face 30 would have to be modified for silica production using silane. In particular, it is desirable to provide an inert shield around silane so that silane does not immediately react with oxygen upon exiting the burner. Delaying reaction of silane with oxygen helps protect the burner face from soot build-up. FIG. 4 shows a plan view of a burner face 37 that may be used in place of burner 30. The burner face 37 contains regions 38–46 through which the fuel/oxygen mixture 13 from the premixing chamber 12 and the other reactant gases used in producing the silica particles are introduced into the refractory furnace 16. Region 38 overlaps the bore of the fume tube 24, while region 40 overlaps the space between the fume tube 24 and the central bore 33 of the face block 19. The remaining regions 42, 44, 45, and 46 are each composed of multiple orifices, although continuous open rings can be used for these regions, as illustrated in FIG. 5. The gases carried by the regions 38–46 are shown in Table 1 below. It should be noted that the silane flowing out of region 38 is enveloped by the nitrogen flowing out of region 40. It should be clear, however, that an inert gas other that nitrogen, e.g., argon, can also provide the inert shield around the silane flow. Further note that burners having some regions made of holes (such as in FIG. 4) and other regions made of annuli (such as in FIG. 5) can be used.

TABLE 1

| Annular Region | Gas |
| --- | --- |
| 38 | Silane 11 |
| 40 | Nitrogen 17A |
| 42 | Fuel/Oxygen mixture 13 |
| 44 | Fuel/Oxygen mixture 13 |
| 45 | Fuel/Oxygen mixture 13 |
| 46 | Oxygen 10B |

The size and distribution of the holes 38–46 on the burner face 37 should be appropriately selected to achieve desired flame velocity and thermal output. It should be noted that the flame velocity and thermal output of hydrogen and methane are different. Therefore, a burner configuration that achieves a desired flame velocity and thermal output with hydrogen may not necessarily achieve the same desired flame velocity and thermal output with methane or other hydrogen-containing fuel. Typically, multiple burners will be used to achieve desired feed/flow rates of the reactant gases. When multiple burners are used, distribution mechanisms may be employed to distribute the reactant gases to the burners.

EXAMPLE 1

Table 2 below shows the flow rates for the various gases shown in Table 1 using, for example, the burner face 37 of FIG. 4 and the burner construction of FIG. 3. The fuel in this example is hydrogen gas. None of the gases shown in Table 2 are preheated prior to being injected into the burner. The flow of silane 11 is controlled by a mass flow controller 51. The flow of fuel 8, oxygen 10A, fuel/oxygen mixture 13, nitrogen 17A, and oxygen 10B is monitored through flowmeters 49 and pressure valves (not shown). The resulting glass has molecular hydrogen content of $4.0 \times 10^{18}$ molecules and 610 ppm OH. The chlorine content of the resulting glass is less than 10 ppm (0.001% by weight), as measured by electron microprobe analysis. It should be noted that the flow rate shown for the fuel 8 in the fuel/oxygen mixture 13 in Table 2 is the total flow rate to the three holes 42, 44, and 45 of the burner. The ratio of the flow rate of the fuel 8 in the fuel/oxygen mixture 13 to the sum of the flow rates of the oxygen 10A in the fuel/oxygen mixture 13 and the oxygen 10B is 2.5. The ratio of the flow rate of the fuel 8 in the fuel/oxygen mixture 13 to the flow rate of silane 11 is approximately 21.

TABLE 2

| Gas | Flow rate (standard liters per minute) |
| --- | --- |
| Silane 11 | 3.5 |
| Nitrogen 17A | 10 |
| Oxygen 10B | 15 |
| Fuel 8 (in Mixture 13) | 75 |
| Oxygen 10A (in Mixture 13) | 15 |

EXAMPLE 2

Table 3 below shows the flow rates for the various gases shown in Table 1 using, for example, the burner face 37 of FIG. 4 and the burner construction of FIG. 3.

TABLE 3

| Gas | Flow rate (standard liters per minute) |
| --- | --- |
| Silane 11 | 2.5 |
| Nitrogen 17A | 6 |
| Oxygen 10B | 15 |
| Fuel 8 (in Mixture 13) | 75 |
| Oxygen 10A (in Mixture 13) | 15 |

The fuel in this example is hydrogen gas. Again, none of the gases shown in Table 3 are preheated prior to being injected into the burner. The resulting glass has molecular hydrogen content of $4.9 \times 10^{18}$ molecules and 620 ppm OH. The chlorine content of the resulting glass is less 10 ppm (than 0.001% by weight), as measured by electron microprobe analysis. The ratio of the flow rate of the fuel 8 in the fuel/oxygen mixture 13 to the sum of the flow rates of the oxygen 10A in the fuel/oxygen mixture 13 and the oxygen 10B is 2.5. The ratio of the flow rate of the fuel 8 in the fuel/oxygen mixture 13 to the flow rate of silane 11 is 30.

The process described above provides advantages. One advantage is that the boule or bulk fused silica produced from the process has high purity, higher than obtained when using OMCTS or $SiCl_4$ as a precursor. This happens because silane has a higher raw material purity than OMCTS or $SiCl_4$. High purity in bulk fused silica is especially valuable for producing optical elements such as ultraviolet transmitting lenses. Another advantage is that silane exists as a vapor. As such, it is not necessary to vaporize silane before injecting it into the furnace. Additionally, silane is a desirable precursor because the by-products of the flame hydrolysis process is only water, thus producing no environmentally unfriendly material. The chlorine content of the bulk fused silica was found to be less than 10 ppm (0.001% by weight). In production of relatively large boules, the maximum capture rate efficiencies of silica particles measured using $SiCl_4$ and OMCTS have ranged from 60–70%. The capture rate efficiency when using silane as a precursor is as much or more than current capture rate efficiency when using OMCTS or $SiCl_4$ as a precursor.

While the invention has been described with respect to a limited number of embodiments, those skilled in the art will appreciate that other embodiments of the invention can be devised which are within the scope of the invention. Accordingly, the scope of the invention should be limited only by the appended claims.

What is claimed is:

1. A method for preparing high-purity, bulk fused silica, comprising:
   supplying silane gas, a gaseous fuel, and oxygen gas to a combustion burner;
   forming silica particles by passing the silane gas into a flame formed by the combustion reaction of the gaseous fuel with the oxygen gas while maintaining the ratio of the flow rate of the gaseous fuel to the flow rate of the silane gas no less than twelve and the ratio of the flow rate of the gaseous fuel to the flow rate of the oxygen gas no less than two; and
   immediately depositing the silica particles onto a hot bait to form a boule.

2. The method of claim 1, wherein the ratio of the flow rate of the gaseous fuel to the flow rate of the silane gas is no greater than 30.

3. The method of claim 1, wherein the ratio of the flow rate of the gaseous fuel to the flow rate of the silane gas is in a range from 12.5 to 30.

4. The method of claim 3, wherein the ratio of the flow rate of the gaseous fuel to the flow rate of the oxygen gas is in a range from 2.0 to 3.0.

5. The method of claim 1, wherein supplying silane gas includes providing a shield of inert gas around the silane gas.

6. The method of claim 1, wherein the inert gas is nitrogen.

7. The method of claim 1, wherein the gaseous fuel is methane gas.

8. The method of claim 1, wherein the gaseous fuel is hydrogen gas.

9. The method of claim 1, wherein the hot bait is heated by the heat produced during combustion reaction of the gaseous fuel with the oxygen gas.

10. The method of claim 9, wherein the hot bait is heated to a temperature at which the boule is directly formed.

11. The method of claim 1, wherein the gaseous fuel is premixed with a portion of the oxygen gas prior to being supplied to the combustion burner.

12. The method of claim 1, wherein supplying silane gas, a gaseous fuel, and an oxygen gas to the combustion burner includes providing an envelope of oxygen gas around the gaseous fuel.

13. The method of claim 1, wherein the boule has a chlorine concentration less than 10 ppm.

14. A method for preparing high-purity, bulk fused silica, comprising:

supplying silane gas, a gaseous fuel, and oxygen gas to a combustion burner;

forming silica particles by passing the silane gas into a flame formed by the combustion reaction of the gaseous fuel with the oxygen gas while maintaining the ratio of the flow rate of the gaseous fuel to the flow rate of the silane gas in a range from 12 to 30 and the ratio of the flow rate of the gaseous fuel to the flow rate of the oxygen gas in a range from 2.0 to 3.0; and immediately depositing the silica particles onto a hot bait to form a boule.

15. The method of claim 14, wherein the gaseous fuel is methane.

16. The method of claim 14, wherein the gaseous fuel is hydrogen gas.

17. The method of claim 14, wherein the boule has a chlorine concentration less than 10 ppm.

* * * * *